R. E. REYNOLDS.
MOLD FOR PLASTIC MATERIAL.
APPLICATION FILED APR. 16, 1918.

1,310,632.

Patented July 22, 1919.
3 SHEETS—SHEET 1.

INVENTOR
Robert E. Reynolds
BY
ATTORNEYS

UNITED STATES PATENT OFFICE.

ROBERT E. REYNOLDS, OF HOUSTON, TEXAS, ASSIGNOR OF ONE-HALF TO T. H. BASS, OF HARRIS COUNTY, TEXAS.

MOLD FOR PLASTIC MATERIAL.

1,310,632.         Specification of Letters Patent.     Patented July 22, 1919.

Application filed April 16, 1918. Serial No. 228,849.

*To all whom it may concern:*

Be it known that I, ROBERT E. REYNOLDS, a citizen of the United States, residing at Houston, in the county of Harris and State of Texas, have invented certain new and useful Improvements in Molds for Plastic Material, of which the following is a specification.

This invention relates to new and useful improvements in a mold for plastic material.

The object of the invention is to provide a mold of the character described which has been especially designed for use in cement and concrete constructions, and is particularly adapted for use in building boats, ships and other water craft.

A further object of the invention resides in the provision of means for mechanically moving the molds or forms so as to set them in position for molding the structure, and to remove them after the plastic material has become hardened and set.

With the above and other objects in view, the invention has particular relation to certain novel features of construction, operation, and arrangement of parts, an example of which is given in this specification and illustrated in the accompanying drawings, wherein:—

Figure 1:
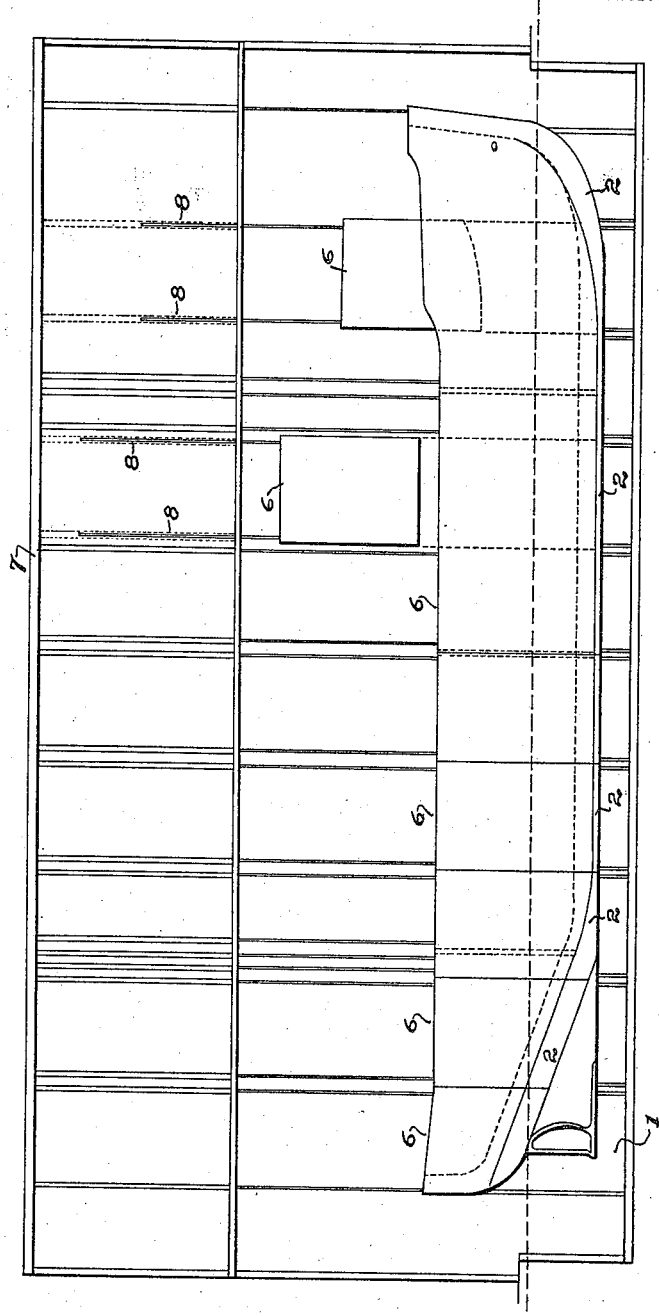
Figure 1, shows a side elevation of a mold, showing a boat as formed therein.

Referring now more particularly to the drawings wherein like numerals of reference designate similar parts in each of the figures, the numeral 1, refers to the pit or way wherein the vessel is formed, said pit being walled, preferably, with concrete. An outside bottom form is provided, formed of transverse sections 2, each of said sections being supported upon hydraulic jacks 3, by means of which said sections may be elevated and lowered, as shown in full and dotted lines, respectively, in Fig. 2. These jacks 3 are embedded in the bottom of the pit 1, and are supported in the usual manner. The outer side forms are formed of sections 4, which are moved laterally by means of hydraulic jacks 5. The inner form of the mold is formed of transverse sections 6, all of said forms being constructed, preferably, of sheet metal, suitably braced. A framework 7 is constructed above the pit and mounted thereon are the hydraulic jacks 8, two of said jacks being provided on each side of each section 6 of the inner form, said jacks being connected to said sections 6, so that the latter may be moved vertically thereby.

In constructing a vessel of plastic material, the bottom molds 2 are first elevated, through the jacks 3, to the desired position, and the side molds 4 are then moved inwardly through the instrumentality of the jacks 5, until they are brought into proper alinement. The sections 6 of the inner form are then lowered into position and into alinement with each other, leaving a space of uniform thickness between the outer and inner forms of the mold, and into this space, plastic concretious material 9 is poured, until the space is entirely filled. The inner form is transversely corrugated, forming the corrugations 10, providing spaces which are filled with the plastic material, and when this material hardens, it forms inner transverse ribs, integral with the walls of the vessel which reinforce and strengthen the same.

Figure 3:
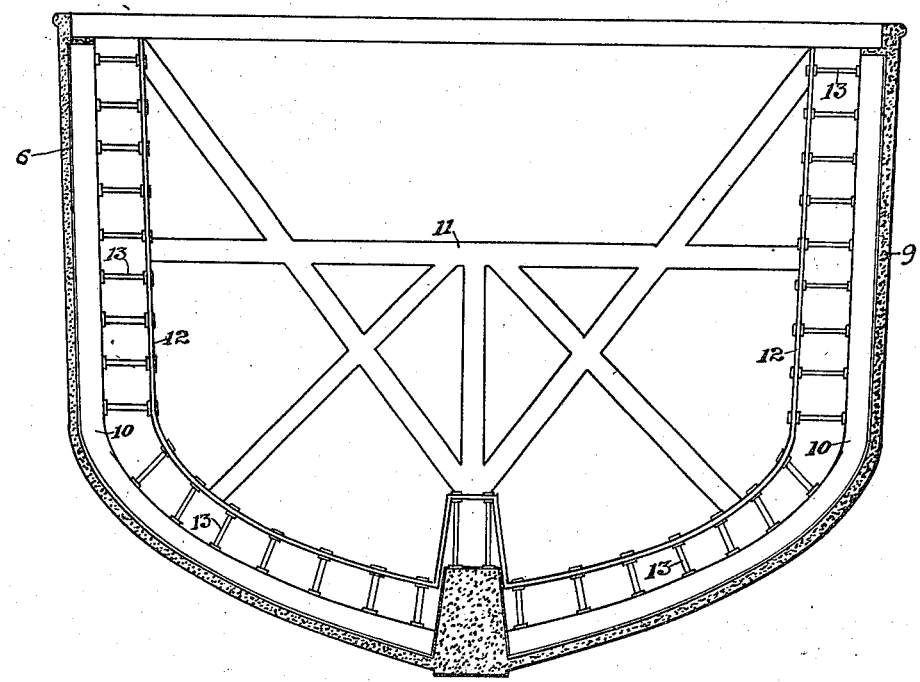
Fig. 3, shows an end view of a section of the inside form constituting a part of the mold.
Figure 4:
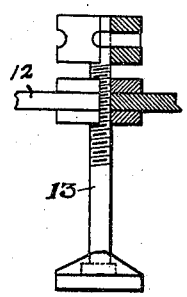
Fig. 4, shows an enlarged view, partially in section, of means for adjusting the inner form.
Figure 5:
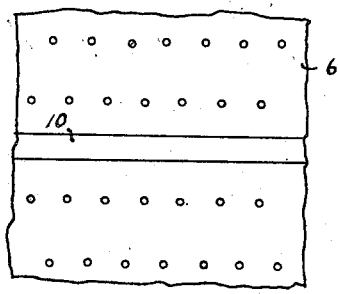
Fig. 5, shows a fragmentary plan view of the inner form of the mold.

As shown in Fig. 3, each form 6 is adjustable relative to its supporting framework 11. To provide for this adjustment, the framework 11, has a metallic band 12, following the contour of the form and spaced therefrom. A plurality of screws 13, have a swivel connection with the corrugations 10 of the forms 6, said screws being threaded through the bands 12. The metal of the inner form is perforated, as shown in Fig. 5, and when the plastic material is poured into the mold, these screws are turned, forcing the inner forms against the plastic material, thus packing said material closely together, and forcing out all air that may have formed into pockets therein.

Figure 2:
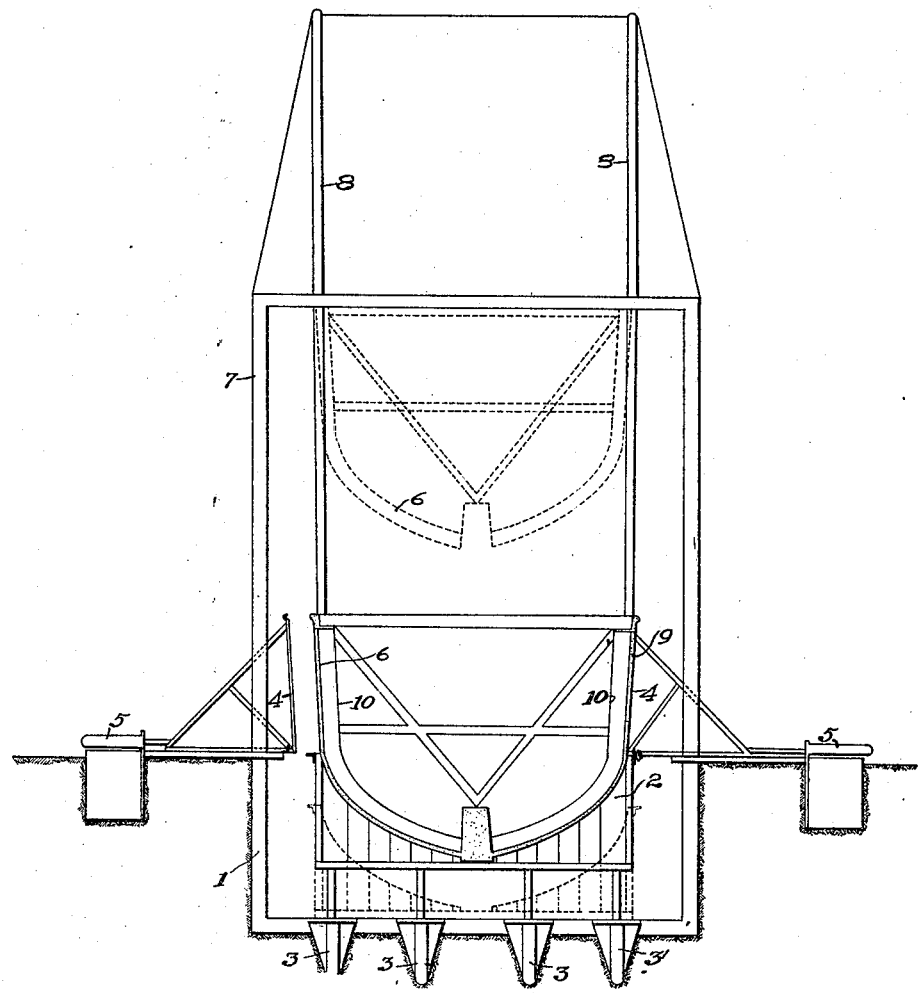
Fig. 2, shows an end elevation.

When the material has set and hardened, the sections 6 of the inner form are elevated, through the instrumentality of the hydraulic jacks 8, into the position shown in dotted lines in Fig. 2, and the outer side forms 4 are then withdrawn through the instrumentality of the hydraulic jacks 5. Water may be then admitted into the pit 1, sufficient to float the vessel and the forms 2 then lowered through the instrumentality of the jacks 3, leaving the vessel afloat, and leaving the forms in position to readily be again assembled into a mold, for the formation of another vessel. The completed vessel may then be floated out of the way, and the bottom, side and inner forms again assembled through the instrumentality of the hydraulic jacks controlling them, and the work proceed as above explained.

What I claim is:

A mold for receiving concretious material, and forming the same into a structure, said mold being composed of outer and inner sectional forms, the inner forms being composed of perforated material, supporting means for said inner forms, hydraulic jacks for supporting said sections in position and assembling them into a mold, and means for adjusting the inner forms, relative to their supporting means, against the material in the mold.

In testimony whereof I have signed my name to this specification in the presence of two subscribing witnesses.

ROBERT E. REYNOLDS.

Witnesses:
JAS. W. OLIVER,
E. V. HARDWAY.

Copies of this patent may be obtained for five cents each, by addressing the "Commissioner of Patents, Washington, D. C."